(12) United States Patent
Nakano et al.

(10) Patent No.: US 7,317,850 B2
(45) Date of Patent: Jan. 8, 2008

(54) OPTICAL SWITCH

(75) Inventors: Junichi Nakano, Hachioji (JP);
Daisuke Matsuo, Hachioji (JP); Kenzi Murakami, Hino (JP); Yoshitaka Kamiya, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/452,811

(22) Filed: Jun. 14, 2006

(65) Prior Publication Data
US 2007/0003187 A1    Jan. 4, 2007

(30) Foreign Application Priority Data
Jun. 30, 2005   (JP)   ............... 2005-191479

(51) Int. Cl.
*G02B 6/26* (2006.01)
(52) U.S. Cl. ............... 385/16; 385/15; 385/24
(58) Field of Classification Search ............ 385/15, 385/16, 24
See application file for complete search history.

(56) References Cited

U.S. PATENT DOCUMENTS 6,625,346 B2   9/2003   Wilde

2006/0239608 A1*   10/2006   Akashi ............ 385/18

FOREIGN PATENT DOCUMENTS

JP   2005-181580 A   *   7/2005

* cited by examiner

*Primary Examiner*—Jennifer Doan
(74) *Attorney, Agent, or Firm*—Scully, Scott, Murphy & Presser, P.C.

(57) ABSTRACT

An optical switch includes an input optical fiber, an output optical fiber, a grating which performs spectral separation of an optical signal to a plurality of optical signals having different wavelengths, a plurality of movable mirrors, each reflecting an optical light subjected to spectral separation, and directing the optical light appropriately to the input fiber, and each of the movable mirrors can be inclined, a mirror-angle detector which detects an angle of inclination of each of the movable mirrors, a table which associates a wavelength number which identifies the optical signals of the plurality of wavelengths, and an output-destination number which identifies the input optical fiber or the output optical fiber, with the angle of inclination of each movable mirror, and a control circuit which performs a feed-back control such that an angle of inclination AD which is output from the table and an output from the mirror-angle detector match.

27 Claims, 10 Drawing Sheets

FIG. 8

| WAVE LENGTH λno | OUTPUT-DESTINATION NUMBER OUTno | TARGET VALUE OF MIRROR ANGLE AT |
|---|---|---|
| 1 | 1 | 2.5 |
| 1 | 2 | 1 |
| 1 | 3 | −0.5 |
| 1 | 4 | −2 |
| 2 | 1 | 2.4 |
| 2 | 2 | 0.9 |
| 2 | 3 | −0.6 |
| 2 | 4 | −2.1 |
| ⋮ | ⋮ | ⋮ |
| N | 1 | 1.3 |
| N | 2 | −0.2 |
| N | 3 | −1.7 |
| N | 4 | −3.2 |

INPUT — OUTPUT

111

OPTICAL SWITCH

CROSS-REFERENCE TO RELATED APPLICATION

The present application is based upon and claims the benefit of priority from the prior Japanese Patent Application No. 2005-191479 filed on Jun. 30, 2005; the entire contents of which are incorporated herein by reference.

BACKGROUND OF THE INVENTION

1. Field of the Invention

The present invention relates to an optical switch, and in particular to an optical switch which outputs an optical signal of a plurality of wavelengths, which is multiplexed.

2. Description of the Related Art

In an optical fiber communication, a wavelength division multiplexing (WDM) communication has been hitherto performed widely. In the wavelength division multiplexing (WDM) communication, by using a plurality of lights of different wavelengths, an independent signal is subjected to a multiplex transmission, and a transmission capacity per optical fiber is increased. In the wavelength division multiplexing communication, in each node for each signal, in other words for each wavelength, a switch for selecting a subsequent transmission-destination node is necessary.

For example, in U.S. Pat. No. 6,625,346, an optical switch used with such an object is disclosed. Wavelength-multiplexed light incident from an input fiber is subjected to spectral separation at a grating. The light subjected to the spectral separation forms an image on an MEMS (Micro Electro Mechanical System) mirror according to each of the wavelengths. Moreover, an angle of inclination of the MEMS mirror is changed. Accordingly, an output fiber can be switched (selected) according to the wavelength. By such optical switch, for each optical signal, in other words, for each wavelength, an optical fiber of an output destination can be selected without performing an optical-to-electrical conversion.

A control of an angle of the mirror in the optical switch described in U.S. Pat. No. 6,625,346, first of all, extracts a partial quantity of light at a tap. Further, the light extracted is monitored at a spectral monitor. Accordingly, the control of the angle is performed according to the wavelength, in other words, according to the mirror.

In such an optical switch of a conventional technology, for controlling an angle of inclination of the mirror, a tap and a spectral monitor are required to be provided outside. Therefore, such optical switch causes an increase in an optical loss. Furthermore, due to installation of the spectral monitor, there is an increase in a size and a cost of the apparatus.

SUMMARY OF THE INVENTION

The present invention is made in view of the abovementioned issues, and an object of the present invention is to provide a small-size optical switch at a low cost in which an optical loss is reduced.

To solve the issues mentioned above, and to achieve the object, according to the present invention, there can be provided an optical switch which includes at least one input optical fiber to which optical signals of a plurality of wavelengths are multiplexed and input, at least one output fiber, a wavelength dispersive element which performs a spectral separation of the optical signal from the input optical fiber to a plurality of optical signals of different wavelengths, a plurality of movable mirrors, each of the mirrors being inclinable and reflects each of the optical signals subjected to the spectral separation, from the wavelength dispersive element, and directs appropriately to the output optical fiber, a mirror-angle detector which detects an angle of inclination of each movable mirror, a first calculating unit which associates a first value which identifies the optical signals of the plurality of wavelengths, and a second value which identifies the input optical fiber or the output optical fiber, with the angle of inclination of each movable mirror, and a control circuit which performs a feed-back control of the movable mirror such that a value of the angle of inclination of the movable mirror, which is output from the first calculating unit, and an output from the mirror angle detector match.

Moreover, according to a preferable aspect of the present invention, it is desirable that the optical switch further includes a second calculating unit which associates the first value and the second value with a driving current or a drive voltage of each movable mirror, and that an output of the second calculating unit is added to the control circuit.

Furthermore, according to another preferable aspect of the present invention, it is desirable that the first calculating unit further associates a third value which is equivalent to an amount of attenuation applied to the optical signal, with the angle of inclination of each movable mirror.

According to still another preferable aspect of the present invention, it is desirable that the movable mirror includes a movable section on which a mirror is provided, a fixed section, an elastic supporting section which inclinably supports the movable section with respect to the fixed section, a base substrate which is connected to the fixed section, and is provided to face the movable section, a fixed electrode which is provided on the base substrate, and a movable electrode which is provided on the movable section, and that the mirror-angle detector detects the angle of inclination of the mirror based on an electrostatic capacitance between the fixed electrode and the movable electrode.

Moreover, according to still another preferable aspect of the present invention, it is desirable that any one of the fixed electrode and the movable electrode includes a first independent electrode and a second independent electrode which are provided substantially symmetrically, sandwiching an axis of inclination of the movable section, and the other one of the fixed electrode and the movable electrode includes a common electrode which is at the same electric potential, and that the mirror-angle detector detects the angle of inclination of the movable mirror based on a difference between a first capacitance which is determined by the first independent electrode and the common electrode, and a second capacitance which is determined by the second independent electrode and the common electrode.

Furthermore, according to still another preferable aspect of the present invention, it is desirable that the fixed electrode includes the first independent electrode and the second independent electrode, and the movable electrode includes the common electrode.

According to still another preferable aspect of the present invention, it is desirable that a first reference signal is applied to the first independent electrode, and a second reference signal which has a phase differing by approximately 180 degrees from a phase of the first reference signal, is applied to the second independent electrode, and that a difference between the first capacitance and the second capacitance is detected by detecting a signal which appears at the common electrode.

According to still another preferable aspect of the present invention, it is desirable that an amplifier circuit which generates the first reference signal and the second reference signal, and which amplifies the signal extracted from the common electrode, is provided to the fixed section or the base substrate.

Moreover, according to still another preferable aspect of the present invention, it is desirable that the elastic supporting section includes a first elastic supporting section and a second elastic supporting section which are provided substantially symmetrically, with the movable section sandwiched between the first elastic supporting section and the second elastic supporting section, and a straight line which connects the first elastic supporting section and the second elastic supporting section is substantially orthogonal to a direction in which the plurality of movable mirrors are provided, and that wires from the movable electrode are drawn along the first elastic supporting section or the second elastic supporting section.

Furthermore, according to still another preferable aspect of the present invention, it is desirable that wires from the movable electrode in a movable mirror which is disposed at an odd-number position when counted in an order from a predetermined side, are drawn along the first elastic supporting section, and wires from the movable electrode in a movable mirror which is disposed at an even-number position are drawn along the second elastic supporting section.

According to still another preferable aspect of the present invention, it is desirable that the optical switch further includes a plurality of metal columns for electrically connecting the fixed section and the base substrate, and each of the wires from the movable electrode is connected to the base substrate via the metal column.

Moreover, according to still another preferable aspect of the present invention, it is desirable that the optical switch further includes a fixed drive electrode which is provided on the fixed section, and a movable drive electrode which is provided on the movable section, facing the fixed drive electrode, and that the movable section is caused to be inclined by electrostatic attraction between the fixed drive electrode and the movable drive electrode.

Furthermore, according to still another preferable aspect of the present invention, it is desirable that the fixed electrode and the fixed drive electrode, and the movable electrode and the movable drive electrode are provided by isolating electrically.

According to still another preferable aspect of the present invention, it is desirable that wires from the movable drive electrode and the wires from the movable electrode are drawn to opposite sides in relation to the movable mirror.

BRIEF DESCRIPTION OF THE DRAWINGS

FIG. 8 is a diagram showing a structure of a table of the first embodiment;

DETAILED DESCRIPTION OF THE PREFERRED EMBODIMENTS

An optical switch according to embodiments of the present invention will be described below in detail with reference to accompanying diagrams. However, the present invention is not restricted to these embodiments.

First Embodiment

Figure 1:
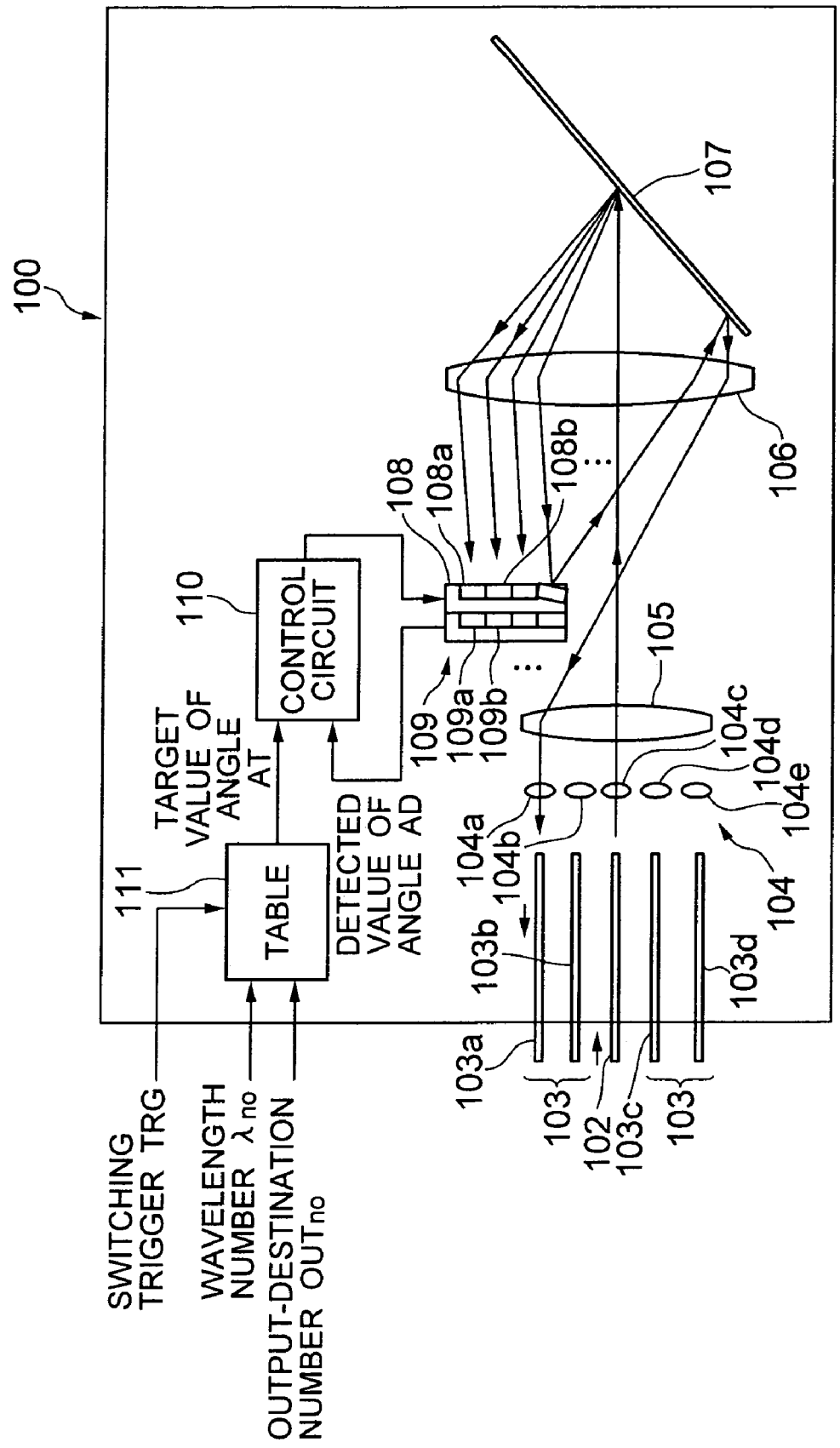
FIG. 1 is a diagram showing a schematic structure of an optical switch according to a first embodiment of the present invention.

FIG. 1 shows a schematic structure of an optical switch of a first embodiment of the present invention. The optical switch 100 is a wavelength-selective optical switch which outputs multiplexed optical signals of a plurality of wavelengths, according to the wavelength. The optical switch 100 includes an input optical fiber 102, an output optical fiber 103, a collimating lens array 104, a lens 105, a lens 106, a grating 107, a movable mirror array 108, an angle sensor array 109, a control circuit 110, and a table 111.

The optical switch 100 can output a wavelength-multiplexed optical signal which is input from the input optical fiber 102, to any one of the output optical fiber 103, by selecting an output destination according to the wavelength. The output optical fiber 103 includes a plurality of optical fibers 103a, 103b, 103c, and 103d. Accordingly, a wavelength-multiplexed individual signal can be subjected to routing according to the wavelength in the same form of light, without returning to an electric signal.

Basic Operation

First of all, a basic operation of the optical switch 100 will be described. Independent optical signals having different wavelengths are input in the multiplexed form to the input optical fiber 102. Light which is input is emitted from the input optical fiber 102, and is incident on a collimating lens 104c. The collimating lens 104c converts the light incident there onto a parallel light. Light emitted from the collimating lens 104c is passed through the lens 105 having a positive refractive index, and the lens 106 having the positive refractive index, and is incident on the grating 107. Each of the lens 105 and the lens 106, for example, is a biconvex lens.

The grating 107 which corresponds to a wavelength dispersive element, reflects the incident light, at different angles according to the wavelength. Light reflected passes again through the lens 106. Light passed through the lens 106 is focused at different positions according to the wavelength, and irradiated.

The movable mirror array 108 includes a plurality of independent movable mirrors 108a, 108b, 108c, . . . (hereinafter, called appropriately as "movable mirrors 108a etc."). Each of the movable mirrors 108 etc. is provided at a position at which light of respective wavelength is irradiated.

An angle of inclination of each of the movable mirror 108a etc. can be changed independently. By changing the angle of inclination, an angle of the light to be reflected can be changed. Light reflected by the movable mirror array 108 in a direction different from a direction of the light incident, is advanced through a path which is reverse of a path of the incident light.

Light reflected at the movable mirrors 108a etc. is passed through a collimating lens 104a for example, and is incident on the output optical fiber 103a. Thus, by changing appropriately the angle of the movable mirrors 108a etc., it is possible to select an optical fiber of an output destination for each mirror, in other words, according to the wavelength.

Description of Control System

The movable mirrors 108a etc. are controlled by the control circuit 110. The movable mirrors 108a etc. are structured integrally with the angle sensor array 109 which detects the angle of inclination of the mirror. The angle sensor array 109 includes angle sensors 109a, 109b, . . . (hereinafter called appropriately as "angle sensors 109a etc.") which are provided corresponding to each of the movable mirrors 108a etc. The control circuit 110 controls a feed-back such that the current angle of inclination (detected value) of each of the movable mirrors 108a etc. which is detected by the angle sensors 109a etc. matches with a target value of the mirror angle which is output from the table 111. Details of the feed-back control will be described later.

The table 111 associates a wavelength number λno (first value) which identifies optical signals of plurality of wavelengths, and an output-destination number OUTno (second value) which identifies the input optical fiber 102 or the output optical fiber 103, with the angle of inclination of each of the movable mirror 108a etc. A detail structure and function of the table 111 will be described later.

A host controller which is not shown in the diagram, outputs an instruction information for directing light of nth wavelength to mth output fiber (n and m are any integers). The table 111 outputs a required value of the angle of inclination of each of the movable mirrors 108a etc. based on the instruction information from the controller. This operation is performed for each of the movable mirrors 108a etc. provided in the movable mirror array 108.

Structure of Area Around Movable Mirrors

Figure 2:
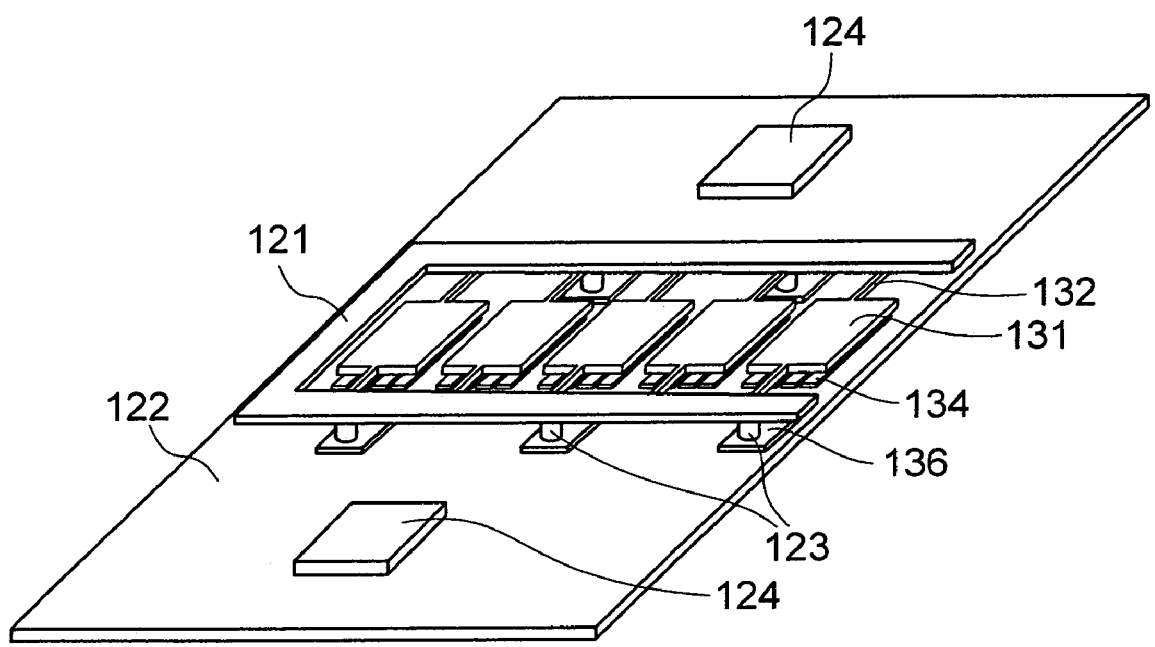
FIG. 2 is a diagram showing a structure near a movable plate of the first embodiment.

A structure of an area around the movable mirror array 108 and the angle sensor array 109 is shown in FIG. 2. The movable mirror array 108 includes a mirror substrate 121 and a base substrate 122. The mirror substrate 121 and the base substrate 122 are connected by a bump 123 with a predetermined gap. A plurality of electrodes is provided to the mirror substrate 121 and the base substrate 122, and the angle of inclination of the movable mirrors 108a etc. is detected by detecting a capacitance between the electrodes.

Thus, the mirror substrate 121 and the base substrate 122 form the movable mirror array 108, and also serve a function of the angle sensor array 109. Moreover, an amplifier 124 for converting a change in capacitance to a voltage, in other words, for outputting as a voltage signal corresponding to the angle of inclination, is provided on the base substrate 122. Details there of will be described later.

Detail of Movable Mirror

Figure 3:
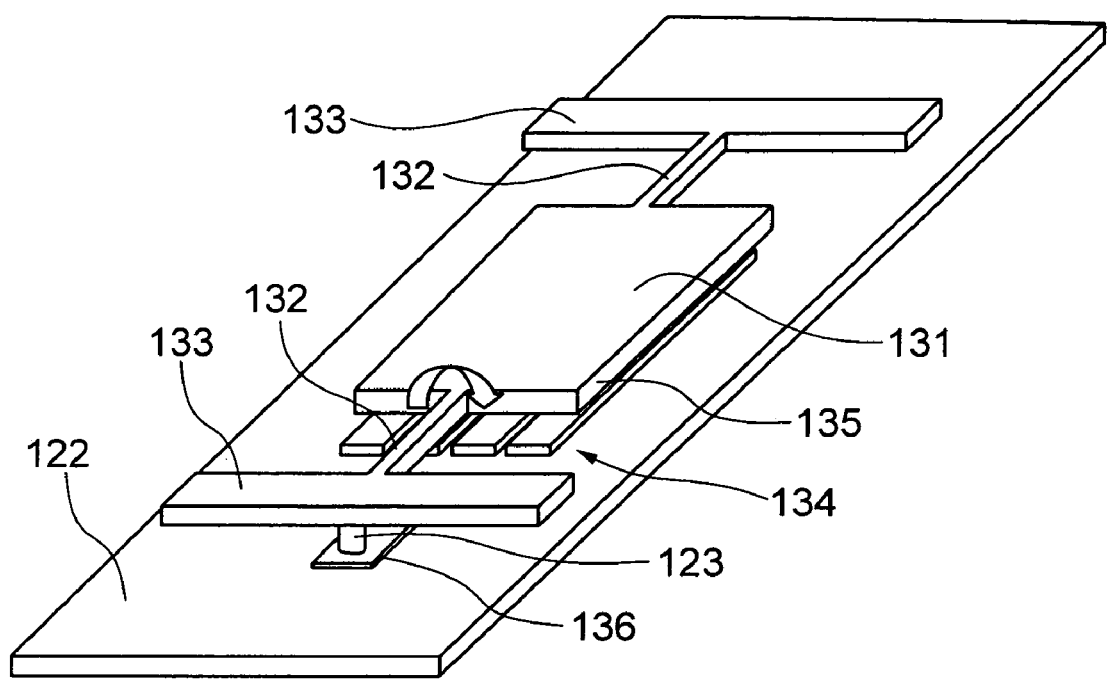
FIG. 3 is a diagram showing an enlarged structure near the movable plate of the first embodiment.

Detailed structure of the movable mirror array 108 and the angle sensor array 109 is shown in FIG. 3. In FIG. 3, a structure of only one from among the plurality of movable mirrors 108a etc. or the angle sensors 109a etc. in the form of an array which form the movable mirror array 108 or the angle sensor array 109, is shown.

The mirror substrate 121 is provided with a movable plate 131, a hinge 132, and a frame 133. The frame 133 is fixed to the base substrate 122 via the bump 123. The movable plate 131 is rotatably supported by a pair of hinges 132. The pair of hinges 132 corresponds to a first elastic supporting section and a second elastic supporting section. Accordingly, the movable plate 131 can change the angle of inclination thereof. Moreover, a reflecting film of a metal is formed on a surface (upper surface in FIG. 3) of the movable plate 131 for reflecting the light.

A fixed electrode group 134 is provided on the base substrate 122. A movable electrode group 135 is provided on a reverse surface (lower side in FIG. 3) of the movable plate 131. The angle of inclination of the movable plate 131 is determined according to an electrostatic force which acts between the fixed electrode group 134 and the movable electrode group 135. At the same time, the angle of inclination of the movable plate is detected by a change in an electrostatic capacitance between the fixed electrode group 134 and the movable electrode group 135.

Detail of Electrode Structure

Figure 4:
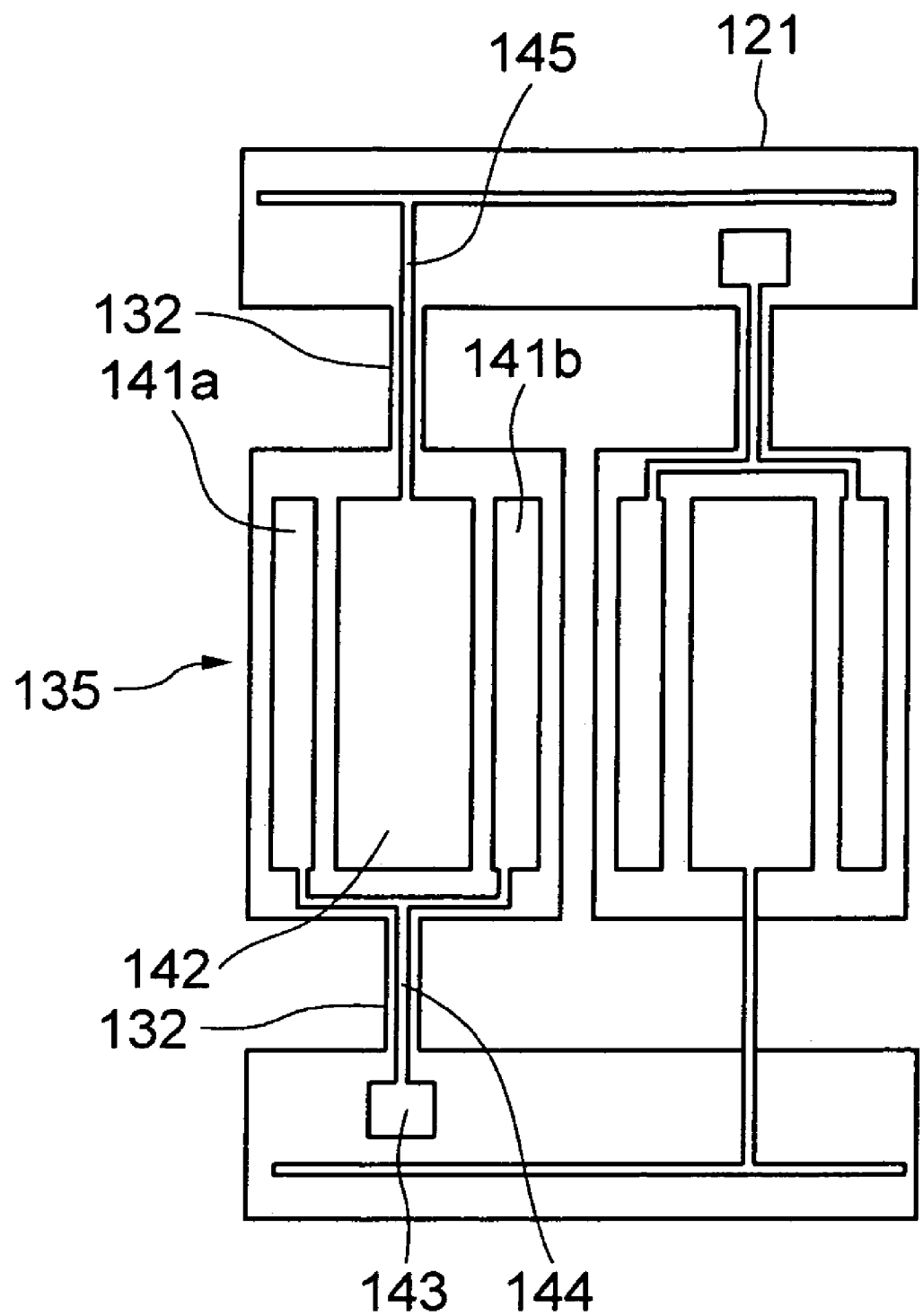
FIG. 4 is a diagram showing a structure of an electrode on a movable side of the first embodiment.
Figure 5:
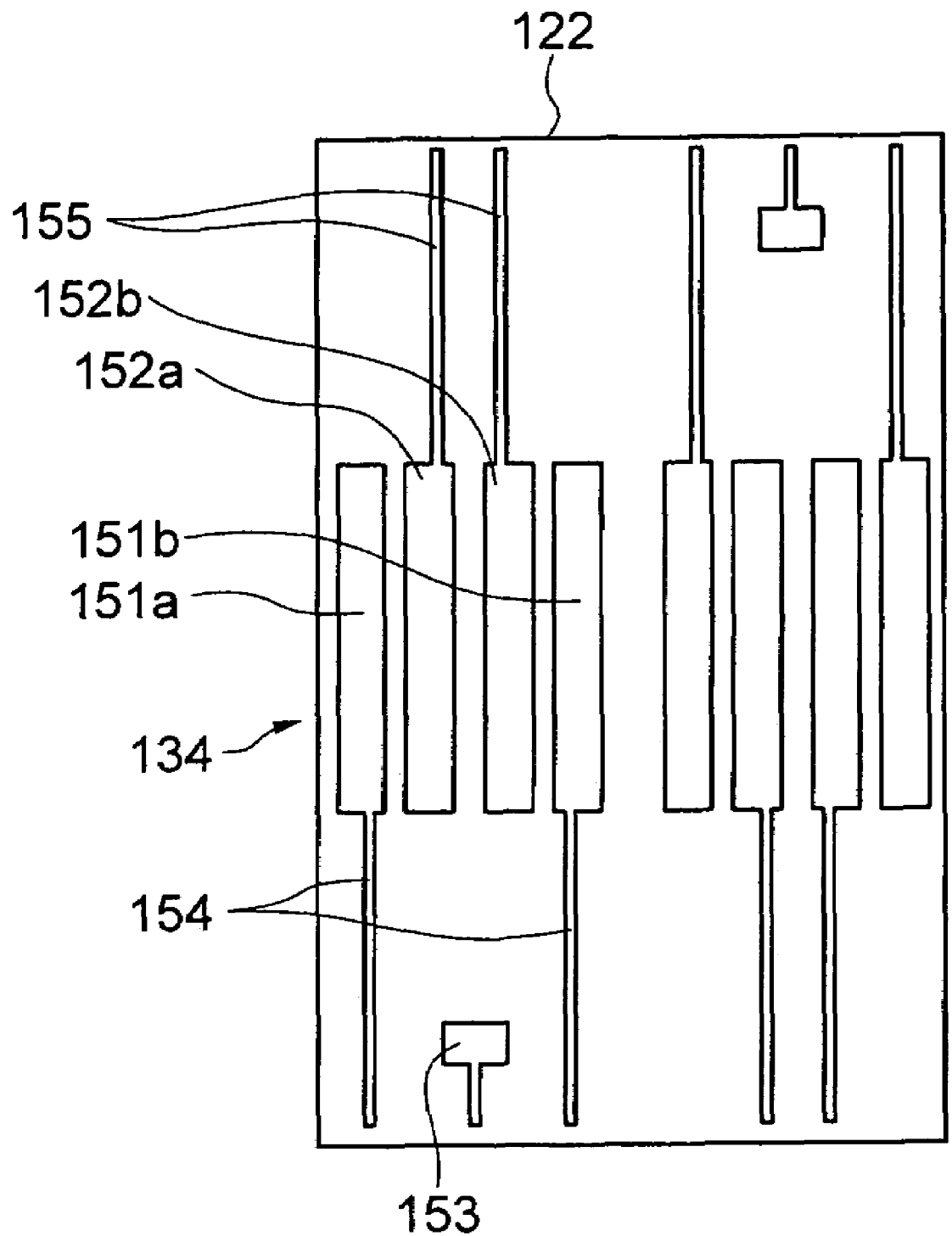
FIG. 5 is a diagram showing a structure of an electrode on a fixed side of the first embodiment.

The fixed electrode group 134 and the movable electrode group 135 are provided on the base substrate 122 and the mirror substrate 121 respectively, as shown in FIG. 4 and FIG. 5. FIG. 4 is top view of the movable electrode group 135, and FIG. 5 is a top view of the fixed electrode group 134. On the movable plate 131, movable-side sensor electrodes 141a and 141b, and a movable-side drive electrode 142 are provided. The movable-side sensor electrodes 141a and 141b are connected by a wire, and can be considered electrically as one electrode. A movable-side sensor electrode wire 144 from the movable-side sensor electrodes 141a and 141b, and a movable-side drive electrode wire 145 from the movable-side drive electrode 142 are drawn along the hinges 132 respectively, on a reverse side.

For example, the wires from the movable-side sensor electrodes 141a and 141b are connected from an electrode for movable-side bump 143 to a side of the base substrate 122 via a bump which is not shown in the diagram. An adjacent movable plate 131 is also provided similarly with a movable-side drive electrode and movable-side sensor electrodes. Moreover, wire of each of the electrodes is drawn in a direction opposite to the wire mentioned above. Thus, the direction of drawing the wire from the drive electrode or the sensor electrode is opposite to a direction of the movable plate 131 (mirror) which is disposed at an odd-number position when counted from a predetermined side, and the movable plate 131 which is disposed at an even-number position when counted from the predetermined side.

On the base substrate 122 facing the movable plate 131, two fixed-side sensor electrodes 151a and 151b, and two fixed-side drive electrodes 152a and 152b are provided. Moreover, there is provided an electrode for fixed-side bump 153 which is connected to the electrode for movable-side bump 143 via the bump which is not shown in the diagram. Fixed-side sensor electrode wires 154 from the fixed-side sensor electrodes 151a and 151b are drawn toward the electrode for fixed-side bump 153, and fixed-side drive electrode wires 155 from the fixed-side drive electrodes 152a and 152b are drawn toward an opposite side. Moreover, even in the base substrate 122, similarly as in the mirror substrate 121, a direction of drawing a wire from drive electrode or a sensor electrode in an adjacent electrode group is opposite.

Both the FIG. 4 and FIG. 5 show a structure as viewed from a mirror surface side. The mirror substrate 121 and the base substrate 122 are joined mutually at a top and a bottom (at an upper side and a lower side) as shown in FIG. 3, with this positional relation as it is. In other words, a diagram of the mirror substrate 121 of FIG. 4 is a diagram of electrodes provided on a lower surface side, drawn as viewed from an upper surface side.

Principle of Drive

As mentioned above, the inclination of the movable mirrors 108*a* etc, in other words, the inclination of the movable plate 131 is performed by the electrostatic force. The movable mirrors 108*a* etc, or the movable plate 131 can be inclined by letting the movable-side drive electrode 142 to be at a fixed electric potential (GND (ground) electric potential, for example), and applying a different voltage to the fixed-side driver electrodes 152*a* and 152*b*. For example, when a voltage which is higher than (absolute value is higher than) a voltage applied to the fixed-side drive electrode 152*b* is applied to the fixed-side drive electrode 152*a*, even stronger electrostatic force is generated between the fixed-side drive electrode 152*a* and the movable-side drive electrode 142. Therefore, the movable plate 131 is inclined such that a side of the fixed-side drive electrode 152*a* comes closer to the base substrate 122.

Principle of Detection of Angle of Inclination

On the other hand, the angle of inclination of the movable mirrors 108*a* etc. is detected by detecting a change in an electrostatic capacitance. The angle of inclination of the movable mirrors 108*a* etc. is detected based on a capacitance between the movable-side sensor electrodes 141*a* and 141*b*, and the fixed-side sensor electrodes 151*a* and 151*b*. When a distance between the two electrodes is short, the electrostatic capacitance is high (is increased). Whereas, when the distance between the two electrodes is long, the electrostatic capacitance is low (is decreased). Therefore, by detecting the electrostatic capacitance, it is possible to detect the angle of inclination of the movable mirrors 108*a* etc.

Concretely, a difference between a capacitance (first capacitance) between the fixed-side sensor electrode 151*a* and the movable-side sensor electrode 141*a*, and a capacitance (second capacitance) between the fixed-side sensor electrode 151*b* and the movable-side sensor electrode 141*b* is calculated. From the difference which is calculated, the angle of inclination of the movable plate 131 can be detected including a direction of inclination (with a sign (plus and minus)). For example, when the movable-side sensor electrode 141*a* of the movable plate 131 is inclined to come closer to the base substrate 122, the first capacitance becomes higher than the second capacitance. By calculating the difference between the first capacitance and the second capacitance, the angle of inclination of the movable plate 131, in other words, the movable mirrors 108*a* etc. can be detected from a sign of plus and minus of the difference.

Figure 6:
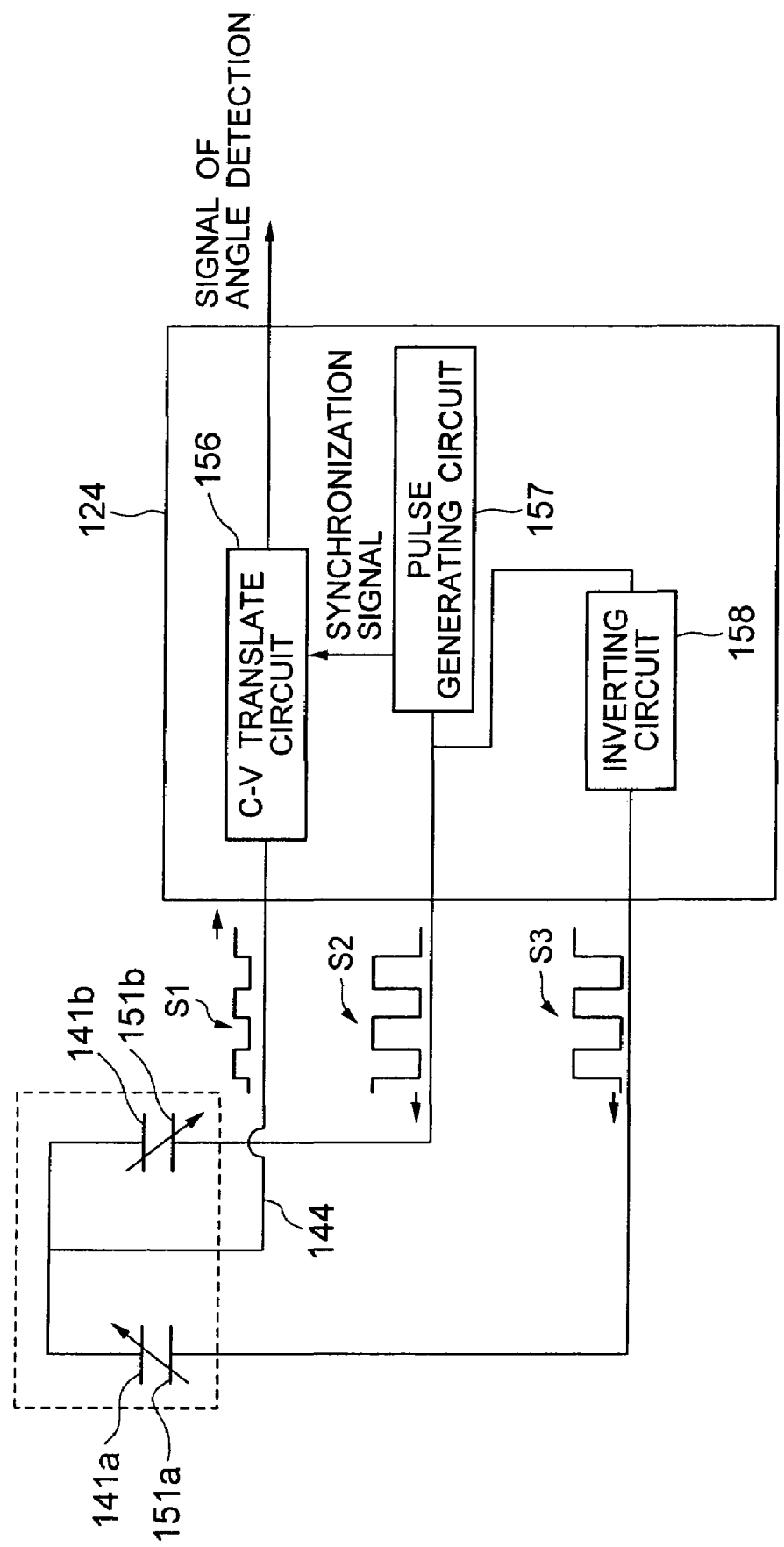
FIG. 6 is a diagram showing a structure for detecting a capacitance of the first embodiment.

In the first embodiment, the difference between the first capacitance and the second capacitance is detected by a method shown in FIG. 6. Generally, the capacitance is detected by applying a sine wave or a rectangular wave to a capacitance, and converting that impedance to a voltage by an amplifier, or by detecting an electric charge which is charged to the capacitance.

In a case of the first embodiment, the difference between the first capacitance and the second capacitance is calculated. As mentioned above, with the movable-side sensor electrode 141*a* and the movable-side sensor electrode 141*b* connected by the movable-side sensor electrode wire 144, a rectangular wave having a phase of reverse polarity differing by 180 degree is applied to the fixed-side sensor electrodes 151*a* and 151*b*. Accordingly, a signal corresponding to the difference in the capacitance is appeared at the movable-side sensor electrodes 141*a* and 141*b*, which are common electrodes. For example, when the movable plate 131 is horizontal with respect to the base substrate 122, the first capacitance and the second capacitance are the same. Therefore, the signal doesn't appear at the movable-side sensor electrodes 141*a* and 141*b*.

Concretely, a pulse generating circuit 157 generates a rectangular pulse signal S2 of a predetermined cycle. The rectangular pulse signal S2 is applied to the fixed-side sensor electrode 151*b*. Moreover, a rectangular pulse signal S3 having a polarity reversed through an inverting circuit 158 is applied to the fixed-side sensor electrode 151*a*. Accordingly, a pulse signal equivalent to the difference in the capacitance is appeared at the movable-side sensor electrodes 141*a* and 141*b* which are common electrodes. This signal S1 is extracted via the movable-side sensor electrode wire 144 and the bump 123. Moreover, by a C-V translate circuit 156, an amplitude is detected by matching with a synchronization signal from the pulse generating circuit 157. As a result, the difference in capacitance, in other words, the angle of inclination of the movable section 131 can be calculated as a voltage signal.

Description of Feed-Back System

Figure 7:
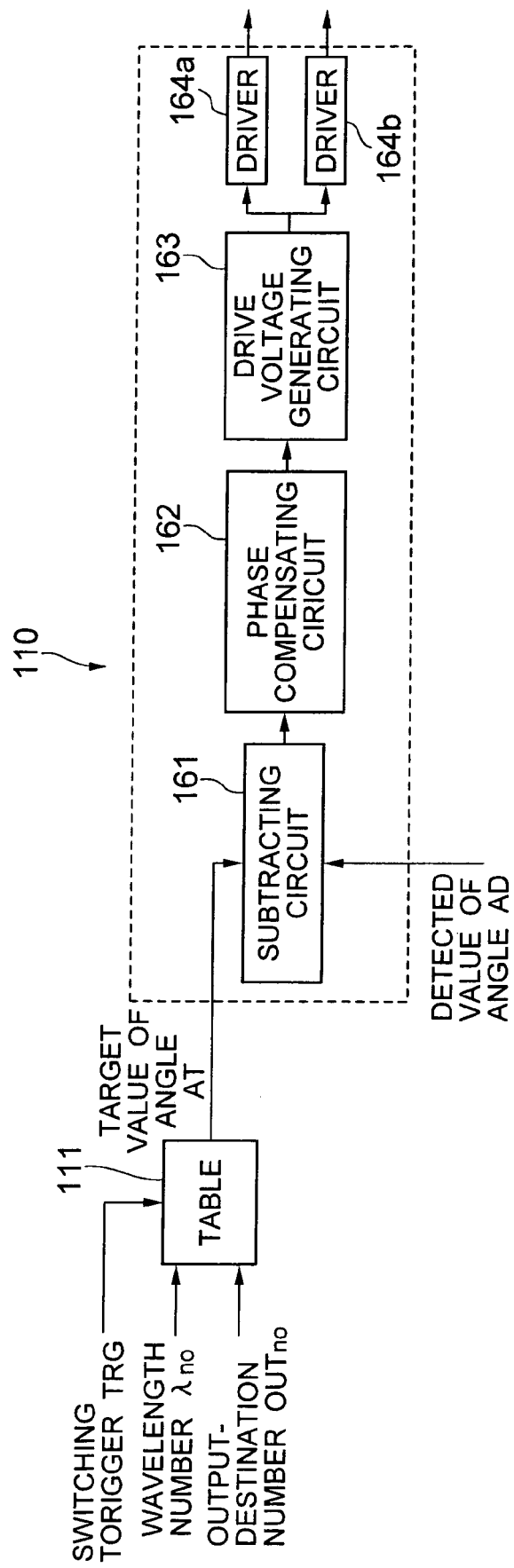
FIG. 7 is a diagram showing a structure of a control circuit of the first embodiment.

Information of the angle of inclination of the movable mirrors 108*a* etc. obtained in this manner, is fed-back to a drive signal of the movable mirrors 108*a* etc. by the control circuit 110, of which a detail structure is shown in FIG. 7. A switching trigger TRG, a wavelength number λno, and an output-destination number OUTno are input to the table 111 from a controller which is not shown in the diagram. The control circuits 110 are provided according to the number of movable mirrors 108*a* etc. For example, when there are k number of movable mirrors 108*a* etc., k number of control circuits 110 are provided (where k is any integer).

Description will be continued coming back to FIG. 7. An output from the amplifier 124 is input as a detected value of angle AD, to a subtracting circuit 161. A target value of angle AT which is output from the table 111 is also input to the subtracting circuit 161. Further, the subtracting circuit 161 calculates a difference between the detected value of angle AD and the target value of angle AT. A difference signal is amplified by a phase compensating circuit 162 which is for stabilizing frequency characteristics. An amplified signal is input to a drive-voltage generating circuit 163 which is for generating a drive voltage.

The drive-voltage generating circuit 163 calculates a voltage which has to be applied to each of the pair of the fixed-side drive electrodes 152*a* and 152*b*. Concretely, a calculation of adding or subtracting an output of the phase compensating circuit 162 with respect to a predetermined bias is performed, and a voltage to be output to each of the fixed-side drive electrodes 152*a* and 152*b* is determined. This voltage is amplified via drivers 164*a* and 164*b*, and is applied to the fixed-side drive electrodes 152*a* and 152*b*.

Here, a control is performed to drive the movable plate 131 such that an error concerning a relation between a polarity of an error signal calculated by the subtracting circuit 161, and a polarity of rotation of the moving plate 131 which is driven by the drivers 164*a* and 164*b* is decreased. Accordingly, the error can be let to be nearly zero all the time. In other words, a feed-back control for matching the detected value of angle AD with the target value of angle AT can be performed.

Operation of Table

The target value of angle AT applied to the control circuit is calculated by the table 111. In the optical switch 100 of the first embodiment, independent lights of a plurality of wavelengths are required to be combined at any of the respective output optical fibers 103a etc. with minimum loss. Therefore, the table 111, as mentioned above, maintains a value of a mirror angle corresponding to an optical fiber at an output destination, according to the wavelength, in other words, for each of the movable mirrors 108a etc.

In the table 111 the wavelength number λno, the output-destination number OUTno, and the target value of angle AT of the mirror are stored upon being associated. The switching trigger TRG is a signal for switching the wavelength number λno and the output-destination number OUTno which are to be selected. A target value of angle AT of the mirror corresponding to the wavelength number λno and the output-destination number OUTno which are selected by the switching trigger TRG is output.

The table 111 inputs the number of wavelength, or in other words, number of the movable mirrors 108a etc, and number assigned to the output optical fiber 103, and outputs the target value of angle AT of the movable mirror 108a etc. The table 111, for example, can be realized by a method in which the number of the movable mirror 108a etc, and the number of the output fiber 103 are applied to an address of a ROM, and corresponding data is read. A value which is read may be latched according to the requirement.

FIG. 8 shows a structure of the table 111. Here, the wavelength number λno is a number from 1 to N which is assigned to each wavelength which is multiplexed. Moreover, the output-destination number OUTno is a number from 1 to 4 which corresponds to the output optical fibers 103a, 103b, 103c, and 103d. The target value of angle AT of the mirror which is output is not a value of an angle, but may be a value which is obtained by multiplying the value of an angle by a predetermined coefficient, such as a value equivalent to a gain of the amplifier 124 or the angle sensor array 109.

If the wavelength number λno and the output-destination number OUTno can be associated with the target value of angle AT of the movable mirror 108a etc, such a function can also be realized by a means which differs from the table. Examples of such means are a means which calculates from a theoretical formula of an abovementioned relation, by using a processor, a means which calculates by deriving an approximation formula from an experimental result, and a means which calculates by an interpolation and extrapolation from a number of experimental results.

As described above, in the optical switch 100 of the first embodiment, the angle sensor 109a etc. is provided to each of the movable mirrors 108a etc. of the movable mirror array 108. Moreover, a feed-back control is performed independently for each of the movable mirrors 108a etc. At the same time, the optical switch is structured such that a target value of the feed-back control is calculated by the table 111 to which the wavelength number λno and the output-destination number OUTno of the output optical fiber are input. Therefore, the control of the movable mirror array 108 can be performed only in an interior of the optical switch 100.

In the first embodiment, light linked to the output is not required to be monitored for the control of the movable mirror by tapping the optical fiber 103 once again. Moreover, a spectral monitor for monitoring is also not required. Therefore, it is possible to avoid an increase in an optical loss by tapping, and an increase in a cost and a space due to installing the spectral monitor.

Moreover, a control for maintaining the angle of inclination of the movable mirrors 108a etc. to a predetermined angle is performed all the time. Therefore, it is possible to provide the optical switch 100 which operates stably in spite of various external disturbances such as a fluctuation in temperature, vibrations, and impact.

Moreover, in the first embodiment, the optical switch has a structure in which the movable mirrors 108a etc. are driven by the electrostatic force, and the angle of inclination of the movable mirrors 108a etc. is detected by the change in the electrostatic capacitance. Therefore, a structure of a driving section and an angle sensor section can be simplified. As a result of this, it is possible to avoid an increase in a size of a surrounding structure of the movable mirrors 108a etc. Therefore, it is possible to realize the movable mirror array 108 having a high fill factor with each of the movable mirrors 108a arranged closely in a direction of an array, in other words, in a direction in which the wavelength is separated. When wavelength fluctuation occurs, a position of a light spot in each of the movable mirrors 108a is shifted. Here, an area of a portion of the movable mirror array 108 having the high fill factor in which the movable mirrors are arranged closely, which functions as a mirror is large. Therefore, even when the wavelength fluctuation has occurred, the incident light can be reflected in a predetermined direction. As a result of this, the optical loss is reduced, and the optical switch 100 with less fluctuation of optical characteristics can be realized.

Moreover, the optical switch 100 is structured to calculate the angle of inclination of the movable mirrors 108a etc. from a difference of capacitance between two electrodes on left and right side respectively which sandwich an axis of inclination. Therefore, even when a stray capacitance is generated in an area around each electrode and in a wire up to the electrode, it is possible to detect the angle of inclination of the movable mirrors 108a etc. without being affected by the stray capacitance. Accordingly, even more accurate control of the movable mirrors 108 etc. becomes possible. As a result of this, a reliability of the optical switch 100 can be improved further.

Moreover, the difference in capacitance is detected by applying reference signals having a phase differing by 180 degrees to each of left and right electrodes on a side of the base substrate 122, and by extracting by connecting a wire on a side of the mirror substrate 121 facing. Therefore, the difference in the capacitance can be detected by a very simple structure.

Furthermore, in the first embodiment, such wire connection is made on a side of the movable plate 131. In other words, a common electrode is provided on the side of the movable plate 131. Therefore, wires coming across from the side of the mirror substrate 121 to the side of the base substrate 122 can be reduced. As a result of this, a manufacturing of the optical switch 100 becomes easy.

Moreover, the wires from this common electrode are drawn, in alternate shifts, up to an odd-number positioned movable mirror and an even-number positioned movable mirror in the movable mirrors 108a, when counted from a predetermined side. Therefore, a wire pitch is widened, and the bumps 123 can be disposed with a satisfactory balance, on both sides of the mirror substrate 121. Accordingly, the wires can be drawn easily and with reliability.

Moreover, the wires are drawn along the hinge 132 which is extended in a direction substantially orthogonal to a direction of the array of the movable mirrors 108a etc. Therefore, the movable mirrors 108a etc. can be disposed closely. As a result of this, the movable mirror array 108 having a high fill factor as described above can be realized. Therefore, it is possible to realize the optical switch 100 in which, when there is a wavelength fluctuation, the optical loss is reduced, and there is less fluctuation of the optical characteristics.

Moreover, the mirror substrate 121 and the base substrate 122 are connected by the bump 123. Therefore, it is possible to connect the substrates collectively, at a plurality of points, and to set a gap between the mirror plate 121 and the base plate 122 to a value which is suitable for electrostatic drive.

Furthermore, by disposing the amplifier 124 near the mirror substrate 121 on the base substrate 122, the difference in capacitance between the electrodes can be detected accurately. Therefore, the angle of inclination of the movable mirrors 108a can be detected with high accuracy.

A drive electrode for driving the movable plate 131 is provided separately from the sensor electrode for detecting the angle of inclination of the movable plate 131. Therefore, a path which drives the movable mirrors 108a etc, and a path which detects the angle there of can be separated. Accordingly, the accuracy of detection of the angle of inclination is improved. As a result of this, an accuracy of the control of the angle of the movable mirrors 108a etc. can be improved. Furthermore, the movable-side drive electrode wire 145 and the movable-side sensor electrode wire 144 are drawn along each of the pair of hinges 132. Therefore, the wires passing through two hinges 132 can be separated to one wire each, and characteristics of hinges 132 can be arranged on both side. For improving mechanical drive characteristics of the movable mirror, an accuracy of the control of the angle of the movable mirrors 108a etc. can be improved by the structure mentioned above.

First Modified Embodiment

In the optical switch 100 of the first embodiment, the feed-back control by which the detected value of angle AD is matched with the target value of angle AT is performed as shown in FIG. 7. In other words, the drive voltage of the movable mirrors 108a etc. is generated by amplifying the difference between the detected value of angle AD and the target value of angle AT. However, without restricting to the first embodiment, as in a first modified embodiment, a feed-forward control by a structure shown in FIG. 9 may also be used simultaneously.

Figure 9:
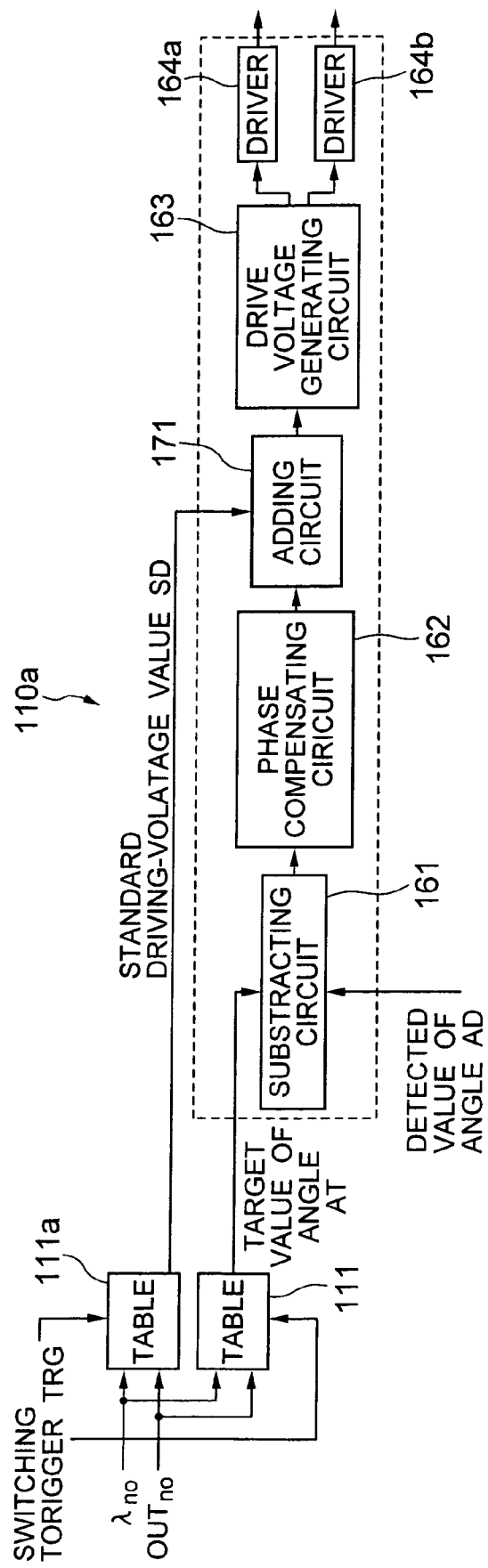
FIG. 9 is a diagram showing a structure of a control circuit of a first modified embodiment of the first embodiment.

A control circuit showed in FIG. 9 outputs a standard drive-voltage value SD in addition to the target value of angle AT of the movable mirrors 108a etc. from the wavelength number λno and the output-destination number OUTno, by a table 111a. The standard drive-voltage value SD is added to an output of the phase compensating circuit 162, in an adding circuit 171. A resultant value of addition is input to the drive-voltage generating circuit 163. Thus, the first modified embodiment, as compared to the control circuit 110 of the first embodiment, differs at a point that the table 111a and the adding circuit 171 are provided.

In the control circuit 110a of FIG. 9, the standard drive-voltage value SD is fed-forward. Moreover, based on this signal, the drive voltage of the movable mirrors 108a etc. is generated. The feed-back control by the difference in the detected value of angle AD and the target value of angle AT is an operation for correcting an error (parameter shift) of the feed-forward. Therefore, a load on a feed-back control system becomes small. Consequently, the accuracy of the control of the angle of inclination of the movable mirrors 108a etc. is improved. Moreover, an operation of the feed-forward is a high-speed operation. Therefore, an operation of the movable mirrors 108a etc. can be accelerated.

Therefore, if the control circuit 110a in FIG. 9 is used instead of the control circuit 110 in FIG. 7, the optical switch having characteristics further stabilized, and a high switching speed can be realized. Here, an increase in a size of the table, and an addition of the adding circuit are necessary. Therefore, it is desirable that a judgment of a design of the control circuit 110a is made upon taking into consideration an overall design of the apparatus.

Second Modified Embodiment

In the optical switch of the first embodiment, the apparatus is described to be operating such that a quantity of light which is output becomes large, and the loss becomes sufficiently small. Here, by modifying the table, an attenuation function in which an independent operation according to the wavelength is possible can also be realized. A structure for realizing the attenuation function is shown in FIG. 10.

A second modified embodiment, as compared to the first embodiment, differs at a point that a structure of a table 111b is different. The table 111b assigns an attenuation amount B, as an input, in addition to the wavelength number λno and the output-destination number OUTno. According to a specified value of the attenuation amount B, the target value of angle AT of the movable mirrors 108a etc. is let to be offset by a small amount. Accordingly, the movable mirrors 108a etc. are inclined according to an amount of offset. Therefore, a coupling efficiency to an output fiber is decreased. As a result of this, a desired attenuation can be applied to an output signal.

Data which is to be stored in the table 111b may be obtained by calculating beforehand a relationship between the attenuation amount B which is generated actually, and the angle of inclination of the movable mirrors 108a etc., or by calibration.

Figure 10:
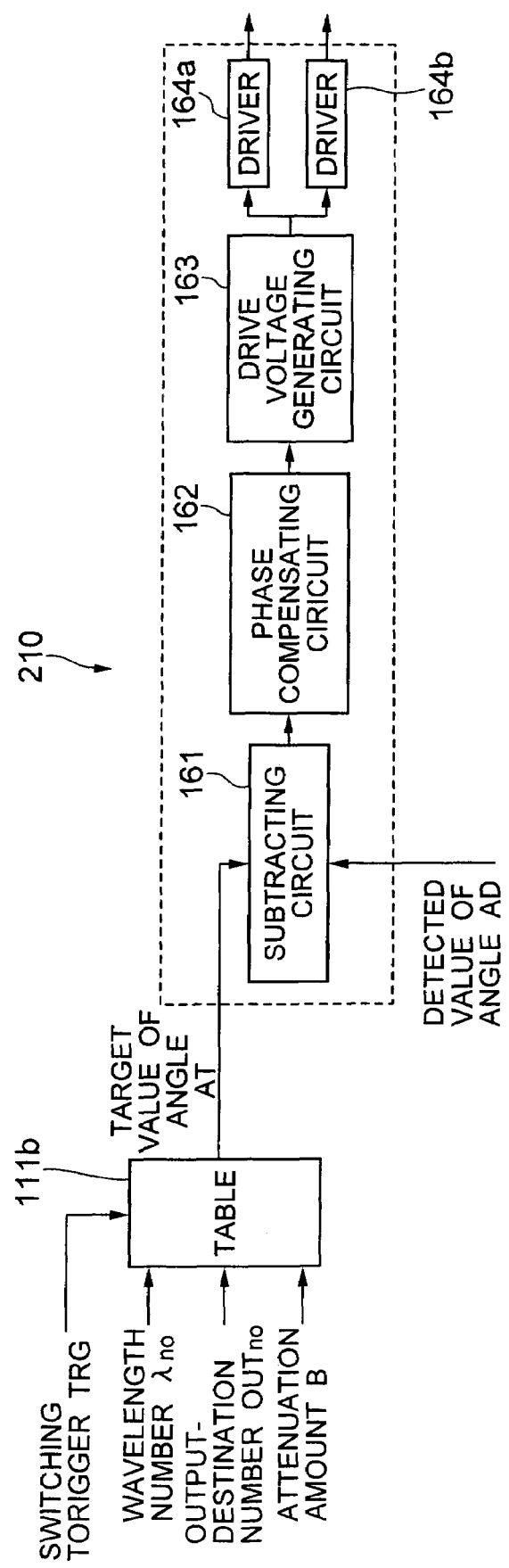
FIG. 10 is a diagram showing a structure of a control circuit of a second modified embodiment of the first embodiment.

Thus, by using a control circuit 210 and the table 111b showed in FIG. 10, the attenuation function can be added to the optical switch by a small modification.

In the second modified embodiment, the change being only the change of the table, there is no increase in the number of components. Moreover, similarly as in the first embodiment, the spectral monitor is not required to be provided outside.

Other Modified Embodiments

In the abovementioned description, a case of one input optical fiber and four output optical fibers is described. It is needless to mention that the number of output optical fibers can be increased. Moreover, by allowing the light to pass in a direction opposite to the direction in FIG. 1, light from a plurality of input optical fibers can be selected and output to one output optical fiber. In either of the cases, according to the present invention, the control of the movable mirrors 108a etc. can be performed without providing the spectral monitor or a tap on a side of the output optical fiber.

Moreover, a concrete optical system for realizing the optical switch, for example a selection of an optical element (device) for spectral separation and a concrete arrangement of lenses, can be modified when deemed appropriate. A modification such as a structure in which a direction in which the movable mirrors 108a etc. are inclined is also let to be a direction orthogonal to (or an intermediate direction) the direction described above, and the optical fibers are also arranged in that direction, is possible.

Moreover, a case of detecting the angle of inclination of the movable mirror array 108 by changing the capacitance was described in the abovementioned description. However, it may be a method other than the method described. For example, a method of measuring an inclination of the movable plate 131 by a strain gauge which is provided on a portion of the hinge 132, or a method of detecting the angle of inclination from a change in an angle of reflection at a reverse surface of the mirror, by providing a light source and a light receiving element (device) on a reverse surface side of the mirror can also be taken into consideration.

Even in a case of detecting the angle of inclination of the movable mirrors 108a etc. by a change in the capacitance, the angle of inclination can be detected from a change in an absolute value of one capacitance, and not detecting the angle of inclination as the difference between the first capacitance and the second capacitance.

Furthermore, even in a case of calculating the difference between the first capacitance and the second capacitance, a judgment of as to whether the independent electrode is to be provided to a fixed side and/or to a movable side is to be made appropriately. In addition, the method of calculating the difference in the capacitance may be a method in which the difference is calculated after calculating an absolute value of each capacitance.

Moreover, a direction of providing upon dividing a plurality of electrodes can be let to be a direction orthogonal to the direction described above. Furthermore, even in a case in which the direction of providing the plurality of electrodes is the same direction as in the abovementioned description, a structure in which the drive electrodes and the sensor electrodes are reversed from inner and outer, is also possible.

Thus, the present invention can have various modified embodiments which fall within the scope of the basic teaching herein set forth.

Thus, in an optical switch according to the present invention, a first calculating unit associates a first value which identifies optical signals of a plurality of wavelengths, and a second value which identifies an input optical fiber or an output optical fiber, with an angle of inclination of each movable mirror. Moreover, a control circuit performs a feed-back control of the movable mirror such that a value of the angle of inclination of the movable mirror, which is output from the first calculating unit, and an output from a mirror-angle detector are matched. Accordingly, a part of quantity of light is not required to be extracted at a tap. Therefore, an optical loss is reduced. Moreover, a spectral monitor is not required to be disposed separately. Therefore, there is no increase in a size and a cost of the apparatus. As a result of this, according to the present invention, an optical switch in which the optical loss is reduced, can be provided with a small size and at a low cost.

Thus, the optical switch according to the present invention is useful as a small-size and low-cost optical switch in which the optical loss is reduced.

What is claimed is:

1. An optical switch comprising:
   at least one input optical fiber to which optical signals of a plurality of wavelengths are input upon multiplexing;
   at least one output optical fiber;
   a wavelength dispersive element which performs a spectral separation of the optical signal from the input optical fiber to a plurality of optical signals of different wavelengths;
   a plurality of movable mirrors, each of the mirrors being inclinable, and reflects each of the optical signal subjected to the spectral separation, from the wavelength dispersive element, and directs appropriately to the output optical fiber;
   a mirror-angle detector which detects an angle of inclination of each movable mirror;
   a first calculating unit which associates a first value which identifies the optical signals of the plurality of wavelengths, and a second value which identifies the input optical fiber or the output optical fiber, with the angle of inclination of each movable mirror; and
   a control circuit which performs a feed-back control of the movable mirror such that a value of the angle of inclination of the movable mirror, which is output from the first calculating unit, and an output from the mirror angle detector match.

2. An optical switch comprising:
   at least one input optical fiber to which optical signals of a plurality of wavelengths are input upon multiplexing;
   at least one output optical fiber;
   a wavelength dispersive element which performs a spectral separation of the optical signal from the input optical fiber to a plurality of optical signals of different wavelengths;
   a plurality of movable mirrors, each of the mirrors being inclinable, and reflects each of the optical signal subjected to the spectral separation, from the wavelength dispersive element, and directs appropriately to the output optical fiber;
   a mirror-angle detector which detects an angle of inclination of each movable mirror;
   a first calculating unit which associates a first value which identifies the optical signals of the plurality of wavelengths, and a second value which identified the input optical fiber or the output optical fiber, with the angle of inclination of each movable mirror;
   a second calculating unit which associates the first value and the second value with a driving current or a drive voltage of each movable mirror, wherein
   an output of the second calculating unit is added to the control circuit; and
   a control circuit which performs a feed-back control of the movable mirror such that a value of the angle of inclination of the movable mirror, which is output from the first calculating unit, and an output from the mirror angle detector match.

3. The optical switch according to claim 2, wherein the first calculating unit further associates a third value which is equivalent to an amount of attenuation applied to the optical signal, with the angle of inclination of each movable mirror.

4. The optical switch according to claim 3, wherein
   the movable mirror includes
   a movable section on which a mirror is provided,
   a fixed section,
   an elastic supporting section which inclinably supports the movable section with respect to the fixed section,
   a base substrate which is connected to the fixed section, and is provided facing the movable section,
   a fixed electrode which is provided on the base substrate, and
   a movable electrode which is provided on the movable section, wherein
   the mirror-angle detector detects the angle of inclination of the mirror based on an electrostatic capacitance between the fixed electrode and the movable electrode.

5. The optical switch according to claim 4, wherein
   any one of the fixed electrode and the movable electrode includes a first independent electrode and a second independent electrode which are provided substantially symmetrically, sandwiching an axis of inclination of the movable section, the other one of the fixed electrode and the movable electrode includes a common electrode which is at a same electric potential, and the mirror-angle detector detects the angle of inclination of the movable mirror based on a difference between a first capacitance which is determined by the first independent electrode and the common electrode, and a second capacitance which is determined by the second independent electrode and the common electrode.

6. The optical switch according to claim 5, wherein the fixed electrode includes the first independent electrode and the second independent electrode, and the movable electrode includes the common electrode.

7. The optical switch according to claim 5, wherein a first reference signal is applied to the first independent electrode, and a second reference signal which has a phase differing by approximately 180 degrees from a phase of the first reference signal, is applied to the second independent electrode, and a difference between the first capacitance and the second capacitance is detected by detecting a signal which appears at the common electrode.

8. The optical switch according to claim 7, wherein an amplifier circuit which generates the first reference signal and the second reference signal, and which amplifies the signal extracted from the common electrode, is provided to the fixed section or the base substrate.

9. The optical switch according to claim 7, wherein the elastic supporting section includes a first elastic supporting section and a second elastic supporting section which are provided substantially symmetrically, with the movable section sandwiched between the first elastic supporting section and the second elastic supporting section, and a straight line which connects the first elastic supporting section and the second elastic supporting section is substantially orthogonal to a direction in which the plurality of movable mirrors is provided, and wires from the movable electrode are drawn along the first elastic supporting section or the second elastic supporting section.

10. The optical switch according to claim 9, wherein wires from the movable electrode in the movable mirror which is disposed at an odd-number position when counted in an order from a predetermined side, are drawn along the first elastic supporting section, and wires from the movable electrode in the movable mirror which is disposed at an even-number position when counted in an order from the predetermined side, are drawn along the second elastic supporting section.

11. The optical switch according to claim 9, further comprising:

a plurality of metal columns for electrically connecting the fixed section and the base substrate, wherein each of wires from the movable electrode is connected to the base substrate via the metal column.

12. The optical switch according to claim 9, further comprising:

a fixed drive electrode which is provided on the fixed section and a movable drive electrode which is provided on the movable section, and facing the fixed drive electrode, wherein the movable section is caused to be inclined by electrostatic attraction between the fixed drive electrode and the movable drive electrode.

13. The optical switch according to claim 12, wherein the fixed electrode and the fixed drive electrode, and the movable electrode and the movable drive electrode are provided by isolating electrically.

14. The optical switch according to claim 12, wherein wires from the movable drive electrode and wires from the movable electrode are drawn to opposite sides in relation to the movable mirror.

15. The optical switch according to claim 4, further comprising:

a fixed drive electrode which is provided on the fixed section; and a movable drive electrode which is provided on the movable section, and facing the fixed drive electrode, wherein the movable section is caused to be inclined by electrostatic attraction between the fixed drive electrode and the movable drive electrode.

16. The optical switch according to claim 15, wherein the fixed electrode and the fixed drive electrode, and the movable electrode and the movable drive electrode are provided by isolating electrically.

17. The optical switch according to claim 15, wherein wires from the movable drive electrode and wires from the movable electrode are drawn to opposite sides in relation to the movable mirror.

18. The optical switch according to claim 2, wherein the movable mirror includes a movable section on which a mirror is provided, a fixed section, an elastic supporting section which inclinably supports the movable section with respect to the fixed section, a base substrate which is connected to the fixed section, and is provided faring the movable section, a fixed electrode which is provided on the base substrate, and a movable electrode which is provided on the movable section, wherein the mirror-angle detector detects the angle of inclination of the mirror based on an electrostatic capacitance between the fixed electrode and the movable electrode.

19. An optical switch comprising:

at least one input optical fiber to which optical signals of a plurality of wavelengths are input upon multiplexing;

at least one output optical fiber;

a wavelength dispersive element which performs a spectral separation of the optical signal from the input optical fiber to a plurality of optical signals of different wavelengths;

a plurality of movable mirrors, each of the mirrors being inclinable, and reflects each of the optical signal subjected to the spectral separation, from the wavelength dispersive element, and directs appropriately to the output optical fiber;

a mirror-angle detector which detects an angle of inclination of each movable mirror;

a first calculating unit which associates a first value which identifies the optical signals of the plurality of wavelengths, and a second value which identifies the input optical fiber or the output optical fiber, with the angle of inclination of each movable mirror; and a control circuit which performs a feed-back control of the movable mirror such that a value of the angle of inclination of the movable mirror, which is output from the first calculating unit, and an output from the mirror angle detector match, wherein the first calculating unit further associates a third value which is equivalent to an amount of attenuation applied to the optical signal, with the angle of inclination of each movable mirror.

20. The optical switch according to claim 19, wherein the movable mirror includes
a movable section on which a mirror is provided,
a fixed section,
an elastic supporting section which inclinably supports the movable section with respect to the fixed section,
a base substrate which is connected to the fixed section, and is provided facing the movable section,
a fixed electrode which is provided on the base substrate, and
a movable electrode which is provided on the movable section, wherein
the mirror-angle detector detects the angle of inclination of the mirror based on an electrostatic capacitance between the fixed electrode and the movable electrode.

21. The optical switch according to claim 1, wherein the movable mirror includes
a movable section on which a mirror is provided,
a fixed section,
an elastic supporting section which inclinably supports the movable section with respect to the fixed section,
a base substrate which is connected to the fixed section, and is provided facing the movable section,
a fixed electrode which is provided on the base substrate, and
a movable electrode which is provided on the movable section, wherein
the mirror-angle detector detects the angle of inclination of the mirror based on an electrostatic capacitance between the fixed electrode and the movable electrode.

22. An optical switch comprising:
at least one input optical fiber to which optical signals of a plurality of wavelengths are input upon multiplexing;
at least one output optical fiber;
a wavelength dispersive element which performs a spectral separation of the optical signal from the input optical fiber to a plurality of optical signals of different wavelengths;
a plurality of movable mirrors, each of the mirrors being inclinable, and reflects each of the optical signal subjected to the spectral separation, from the wavelength dispersive element, and direct appropriately to the output optical fiber, and which movable mirrors include:
a movable section on which a mirror is provided,
a fixed section,
an elastic supporting section which inclinably supports the movable section with respect to the fixed section,
a base substrate which is connected to the fixed section, and is provided facing the movable section,
a fixed electrode which is provided on the base substrate, and
a movable electrode which is provided on the movable section;
a mirror-angle detector which detects an angle of inclination; of each movable mirror,
a first calculating unit which associates a first value which identifies the optical signals of the plurality of wavelengths, and a second value which identifies the input optical fiber or the output optical fiber, with the angle of inclination of each movable mirror; and
a control circuit which performs a feed-back control of the moveable mirror such that a value of the angle of inclination of the movable mirror, which is output from the first calculating unit, and an output from the mirror angle detector match, wherein
any one of the fixed electrode and the movable electrode includes a first independent electrode and a second independent electrode which are provided substantially symmetrically, sandwiching an axis of inclination of the movable section, the other one of the fixed electrode and the movable electrode includes a common electrode which is at a same electric potential, and
the mirror-angle detector detects the angle of inclination of the movable mirror based on a difference between a first capacitance which is determined byte first independent electrode and the common electrode, and a second capacitance which is determined by the second independent electrode and the common electrode.

23. The optical switch according to claim 22, wherein the fixed electrode includes the first independent electrode and the second independent electrode, and
the movable electrode includes the common electrode.

24. The optical switch according to claim 22, wherein
a first reference signal is applied to the first independent electrode, and
a second reference signal which has a phase differing by approximately 180 degrees from a phase of the first reference signal, is applied to the second independent electrode, and
a difference between the first capacitance and the second capacitance is detected by detecting a signal which appears at the common electrode.

25. The optical switch according to claim 21, further comprising:
a fixed drive electrode which is provided on the fixed section; and
a movable drive electrode which is provided on the movable section, and facing the fixed drive electrode, wherein
the movable section is caused to be inclined by electrostatic attraction between the fixed drive electrode and the movable drive electrode.

26. The optical switch according to claim 25, wherein the fixed electrode and the fixed drive electrode, and the movable electrode and the movable drive electrode are provided by isolating electrically.

27. The optical switch according to claim 25, wherein wires from the movable drive electrode and wires from the movable electrode are drawn to opposite sides in relation to the movable mirror.

* * * * *